United States Patent [19]

Young et al.

[11] 4,191,620
[45] Mar. 4, 1980

[54] ELECTROCHEMICAL CONVERSION OF SULFUR-CONTAINING ANIONS TO SULFUR

[75] Inventors: Donald C. Young, Fullerton; Raymond N. Fleck, West Covina, both of Calif.

[73] Assignee: Union Oil Company of California, Los Angeles, Calif.

[21] Appl. No.: 960,300

[22] Filed: Nov. 13, 1978

[51] Int. Cl.² .................. C02C 5/12; C25B 1/00; C25B 11/18
[52] U.S. Cl. .................. 204/149; 204/98; 204/99; 204/128; 423/234
[58] Field of Search .......... 204/98, 99, 128, 61, 204/180 P, 149; 423/234

[56] References Cited

U.S. PATENT DOCUMENTS

| | | | |
|---|---|---|---|
| 2,809,930 | 10/1957 | Miller | 204/128 X |
| 3,150,923 | 9/1964 | Bienstock et al. | 204/128 X |
| 3,427,237 | 2/1969 | Morris | 204/106 X |
| 3,479,261 | 11/1969 | Heredy | 204/61 |
| 3,515,513 | 6/1970 | Parsi | 204/180 P X |
| 3,523,880 | 8/1970 | Parsi | 204/180 P |
| 3,554,895 | 1/1971 | McRae et al. | 204/301 |
| 3,607,001 | 9/1971 | Finfer et al. | 204/98 X |
| 3,785,965 | 1/1974 | Welty | 208/208 M |
| 3,791,966 | 2/1974 | Bearden | 208/208 M |
| 3,801,698 | 4/1974 | Lowrance et al. | 423/234 |
| 3,998,709 | 12/1976 | Winkler | 204/128 X |

OTHER PUBLICATIONS

Konopik et al., Chemical Abstracts, vol. 48, Reg. No. 10411e (1954).

Primary Examiner—Arthur C. Prescott
Attorney, Agent, or Firm—Gregory F. Wirzbicki; Dean Sandford

[57] ABSTRACT

An aqueous solution comprising one or more sulfur-containing anions is introduced into a diaphragmless, mercury, electrolytic cell wherein, in the presence of an impressed direct electric current, the sulfur-containing anions are electro-chemically converted to elemental sulfur. The invention will be found most advantageous in treating spent aqueous absorbents recovered from processes for removing $SO_2$ and $SO_3$ from stack gases.

10 Claims, 1 Drawing Figure

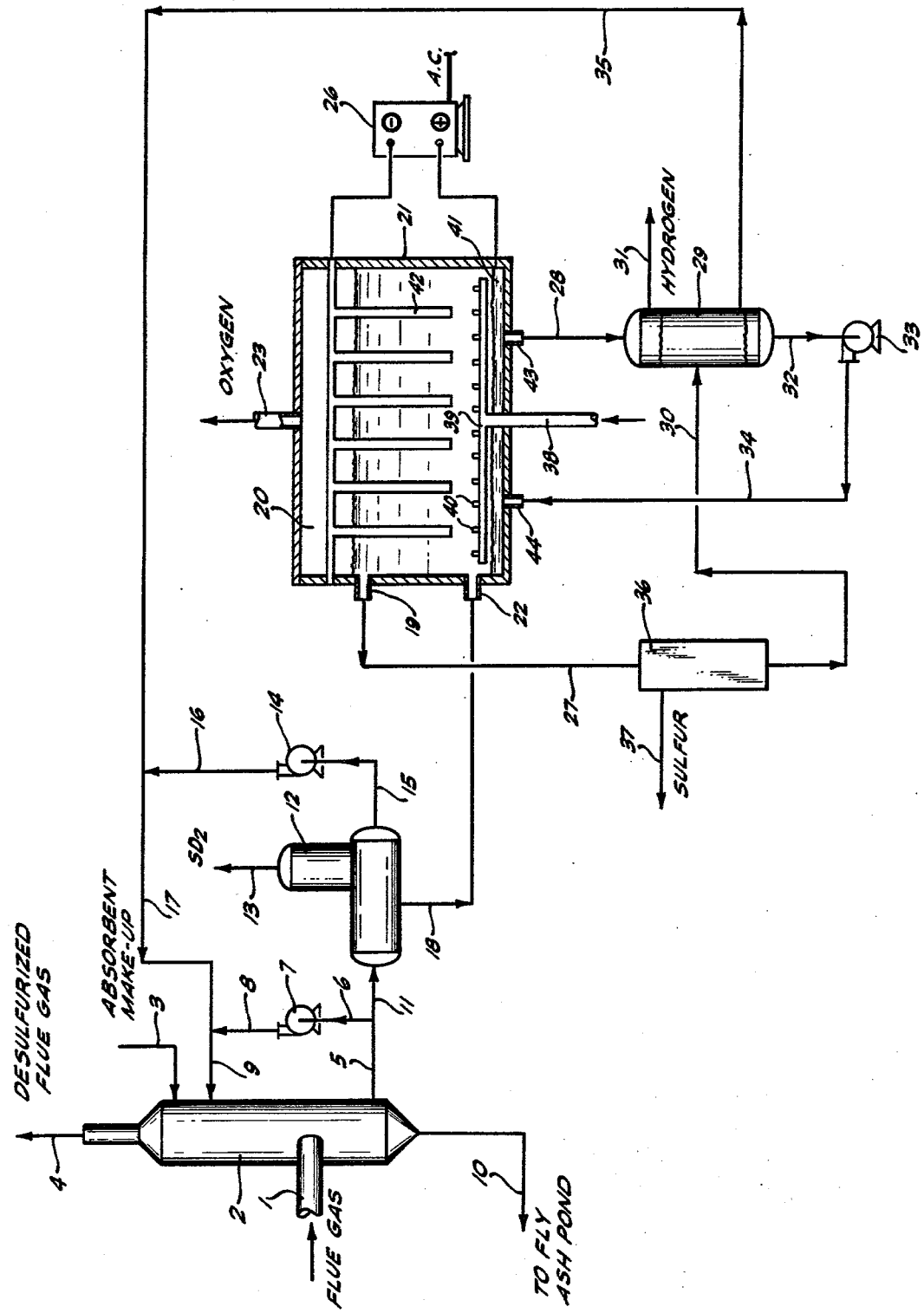

ELECTROCHEMICAL CONVERSION OF SULFUR-CONTAINING ANIONS TO SULFUR

BACKGROUND OF THE INVENTION

This invention relates to a process for electrolytically converting sulfur compounds dissolved in aqueous liquids to elemental sulfur. The invention further relates to a process for removing $SO_x$ compounds from stack gases by absorption in an aqueous absorbent and electrochemically regenerating the resulting spent absorbent.

It is known in the art of sulfur chemistry that $SO_x$ compounds (i.e., $SO_2$ plus $SO_3$) can be removed from stack gas streams by absorption in alkaline, aqueous liquids, e.g., an aqueous solution of sodium hydroxide. It is further known that spent absorbent solutions obtained from such absorption processes, containing, for example, large concentrations of sodium cations and assorted sulfur-containing anions, may be electrochemically regenerated so as to produce a fresh absorbent solution of sodium hydroxide. Processes typifying this approach are shown in U.S. Pat. Nos. 3,607,001 and 3,515,513. In these processes, the spent absorbent solution is first treated, as by stripping or heating, to desorb as much $SO_2$ as possible, thereby producing a concentrated stream of $SO_2$ suitable as one component of a Claus plant feed. The remainder of the spent absorbent, largely comprising an aqueous solution of sodium sulfate, is directed to an electrolytic cell containing two diaphragms (or ion-permeable membranes) separating a feed compartment from anode and cathode compartments. Under the influence of an impressed direct electric current, the sulfate anions migrate from the feed compartment through one diaphragm to the anode compartment, producing therein an anolyte solution comprising sulfuric acid. Simultaneously, cations pass through another diaphragm to the cathode compartment, producing a catholyte solution of sodium hydroxide. Hence, in the usual case, the products removed from the electrolytic cell comprise a sulfuric acid solution and a caustic or other alkali metal hydroxide solution useful as fresh absorbent for removing $SO_2$ from the stack gas.

Several problems are involved in using the electrochemical processes as above described. First, considerable power loss occurs across the diaphragms, thereby reducing the efficiency of the cell. Further, the production of sulfuric acid from such processes is usually undesirable because sulfuric acid is not an economic product to store or transport when produced in large quantities. Moreover, because that portion of the spent absorbent fed to the electrolytic cell contains sulfite, bisulfite, and bisulfate ions as well as sulfate ions, the sulfuric acid produced from the electrolytic cell is impure, and thus of much less economic value than more purified forms of sulfuric acid.

In view of the foregoing, it would be far more desirable to electrochemically convert the sulfate and other oxysulfur anions in such spent absorbent solutions to a single product, preferably a solid product such as elemental sulfur, which is more easily stored and more marketable than sulfuric acid. However, producing sulfur in a typical diaphragm cell raises the obvious problem that the elemental sulfur will easily plug the ion membrane pores and thus render the cell inoperative. Additionally, sulfur could collect around the cathode of the cell and thus interfere with the efficiency of the cell for the intended conversion.

Accordingly, it is an object of the invention to electrochemically produce elemental sulfur in a diaphragmless cell in which one or more sulfur-containing anions are converted to the single, homogeneous product of elemental sulfur. It is a further object to provide a process wherein, by electrochemical conversion in a diaphragmless, mercury, electrolytic cell, the sulfur-containing anions in spent aqueous absorbents recovered from processes for removing $SO_2$ and $SO_3$ from stack gases are converted to elemental sulfur. It is yet another object to provide a diaphragmless, mercury, electrolytic cell in which elemental sulfur is produced from an aqueous electrolyte without the elemental sulfur collecting around the electrodes, especially the mercury electrode, and thus interfering with the cell efficiency. Other objects and advantages inhering in the invention will become apparent to those skilled in the art from the following detailed description.

SUMMARY OF THE INVENTION

In its broadest aspect, this invention comprises subjecting a feed aqueous solution comprising sulfur-containing anions to electrolysis in a diaphragmless, electrolytic cell having elemental mercury as one electrode and a material such as graphite or platinum as the other electrode. In the presence of an applied voltage with the mercury electrode acting as cathode, the sulfur-containing anions are converted to elemental sulfur, which elemental sulfur may be recovered from the cell as a froth floating upon an aqueous liquid product. The aqueous liquid product has a reduced concentration of sulfur-containing anions in comparison to the concentration of sulfur-containing anions in the feed aqueous solution.

One especially beneficial feature of the invention is that elemental sulfur is produced within the cell regardless of the valence state of the sulfur atoms contained in the sulfur-containing anions. If the sulfur is present in a positive valence state, as is the case with sulfate ion, sulfur is formed at the mercury cathode. If in the negative valence state, as in the case of sulfide ion, sulfur is produced at the anode. And if sulfur is contained in both a positive and a negative valence state, as is true for thiosulfate ion, sulfur is produced at both electrodes. Thus, the invention may be utilized to treat an aqueous solution containing an assortment of sulfur-containing anions, and since the sulfur-containing anions are converted in a diaphragmless cell, the elemental sulfur product is advantageously collected in a single electrolyte chamber.

The process of the invention is particularly useful for regenerating spent absorbent solutions obtained from the removal of $SO_2$ and $SO_3$ compounds from stack gases and the like in a $SO_x$ absorber. Spent absorbent solutions recovered from such processes usually contain one or more oxysulfur anions and one or more alkali metal cations. Electrolysis is a diaphragmless, mercury, electrolytic cell yields a mercury-alkali metal amalgam and a slurry comprising an aqueous product and dispersed particles of elemental sulfur. After the slurry is separated into elemental sulfur and the aqueous product, the amalgam is contacted with the separated, now sulfur-free, aqueous product to produce elemental mercury, which elemental mercury is recycled to the cell to replenish the mercury cathode therein. Also produced by the contact of amalgam and aqueous product is an alkali metal hydroxide solution useful as fresh absorbent for removing $SO_x$ compounds in the $SO_x$ absorber. Hence, in the overall process for removing $SO_x$ compounds from stack gas by absorption in an alkali metal hydroxide absorbent solution, regeneration of spent absorbent containing alkali metal cations and oxysulfur anions is accomplished by electrochemically producing elemental sulfur and converting the amalgam by-product into a fresh alkali metal hydroxide absorbent solution.

As used herein, the term "oxysulfur anions" includes all anions containing oxygen and sulfur. Illustrative of such "oxysulfur anions" are $SO_4^{-2}$, $SO_3^{-2}$, $S_2O_3^{-2}$, $S_2O_6^{-2}$, $S_2O_5^{-2}$, $S_2O_7^{-2}$, $SO_3F^{-1}$, $HSO_3^{-1}$, and $HSO_4^{-1}$.

A diaphragmless electrolytic cell is defined herein as an electrolytic cell containing at least one electrolyte chamber in which both the anode and cathode are in intimate contact with the same electrolyte liquid.

BRIEF DESCRIPTION OF THE DRAWING

The drawing shows in schematic form the preferred embodiment of the invention wherein a spent absorbent solution containing sulfur-containing anions, as recovered from a stack gas $SO_x$ absorber, is electrolytically treated in a diaphragmless, mercury, electrolytic cell to regenerate the spent absorbent and also produce elemental sulfur.

DETAILED DESCRIPTION OF THE INVENTION

In the process of this invention, an aqueous solution containing oxysulfur anions or other sulfur-containing anions is introduced into a diaphragmless, electrolytic cell having a suitable anode and a mercury pool cathode. When a direct electric current of sufficient voltage is applied across the electrodes with the aqueous solution acting as electrolyte, the sulfur-containing anions are converted to elemental sulfur, which elemental sulfur, under ambient conditions, is dispersed in the electrolyte in solid particulate form. If, as will be the usual case, the aqueous solution contains an alkali metal cation, such as sodium or potassium, in additon to sulfur-containing anions, the high hydrogen overvoltage of elemental mercury will reduce such cations and produce an alkali metal-mercury amalgam. Thus, as applied to an aqueous solution containing a dissolved compound of sulfur and an alkali metal, the process of the invention results in the simultaneous formation in the cell of two products: an alkali metal-mercury amalgam and an aqueous liquid containing dispersed particles of elemental sulfur.

As is conventional with mercury cells, the amalgam produced at the cathode is preferably withdrawn from the cell and decomposed by contact with an aqueous liquid into elemental mercury and an aqueous solution of a metal hydroxide. After separation of the mercury from the aqueous metal hydroxide solution, which is usually accomplished by taking advantage of the great difference in density between mercury and aqueous solutions, the product mercury is recycled to the cell to replenish the mercury pool cathode while the aqueous metal hydroxide solution is recovered as a by-product.

An alternative but non-preferred method by which the amalgam may be converted to mercury involves periodically reversing the voltage across the electrodes, i.e., after operating for a certain period of time with the mercury as cathode, thereby forming the amalgam, the voltage is reversed so that the mercury becomes the anode. The amalgam is thereby reconverted to mercury without the necessity of withdrawing the amalgam from the cell. In carrying out this embodiment of the invention, it is desirable before the mercury is made the anode that the cell be purged of electrolyte containing dispersed sulfur so that no elemental sulfur is present when the mercury becomes anodic. Otherwise even as the amalgam is being decomposed, the mercury so produced would be converted to mercurous or mercuric sulfide and purpose of reversing the voltage, i.e., to replenish the mercury pool with elemental mercury, would be lost.

The design of the mercury cell is not critical and may be similar to diaphragmless, mercury cells utilized in the chlorine industry. Usually, the cell design will be such that the cathode comprises a pool of mercury lying at the bottom of the cell while the anode, composed of any material having good electrical conductivity and corrosion resistance, such as platinum, palladium, gold, silver, copper, carbon, or graphite, is suspended or supported from the upper portion of the cell chamber. The cell should be designed for high efficiency, as by providing for the anode and cathode to have high surface area exposure to the electrolyte, thereby lowering the current density as low as possible. Additionally, the distance separating the anode and cathode is preferably made small so as to provide a short conductive path through the electrolyte. And if means are employed to keep both the electrolyte and the mercury cathode stirred, efficiency losses due to non-uniform conductance through the electrolyte, or to reduced conductance through the mercury amalgam, are kept to a minimum. Lastly, for maximum efficiency, it is a critical feature of the invention to eliminate energy losses across ion-permeable membranes by utilizing a diaphragmless cell. Preferably, the diaphragmless cell contains a single electrolyte chamber, and the chamber is so designed that the anode and mercury pool cathode therein will both be in contact with the flowing, aqueous electrolyte.

Since in the preferred embodiment sulfur is removed from the cell as dispersed particles carried within an aqueous liquid, the cell is preferably constructed so as to operate near or at ambient conditions and thus produce solid sulfur. However, in alternative embodiments of the invention, the cell may be designed to operate at elevated temperatures and pressures so that advantage may be taken, if desired, of recovering sulfur as a molten liquid.

The most advantageous use of the invention is in treating spent aqueous solutions employed in the removal of $SO_x$ compounds from stack gases and the like. The gas components found in stack gases largely comprise nitrogen, carbon dioxide, and water vapor, with the balance consisting essentially of some combination of oxygen, carbon monoxide, argon, $SO_x$, and $NO_x$ present in individual proportions no greater than about 10 mole percent. Suitable stack gas streams are those containing at least 50 ppmv $SO_x$, preferably at least 500 ppmv $SO_x$, with 95% or more of the $SO_x$ being present as $SO_2$. The typical concentrations of gaseous compounds in stack gas obtained from the combustion of a sulfur-containing fuel is shown in Table I:

TABLE I

| Component | Mol % | Component | ppmv |
|---|---|---|---|
| $O_2$ | 1-5 | CO | 0-500 |

TABLE I-continued

| Component | Mol % | Component | ppmv |
|---|---|---|---|
| CO$_2$ | 10-20 | NO$_x$ | 0-2000 |
| H$_2$O | 5-25 | SO$_2$ | 50-50,000 |
| N$_2$ | 70-75 | SO$_3$ | 0-200 |

Referring now to the drawing, a preferred embodiment of the invention will be described with relation to removing SO$_x$ compounds from a stack gas containing SO$_2$ and SO$_3$. A stack gas, having a gaseous composition falling in the typical ranges listed in Table I, is fed through inlet 1 at a convenient temperature, usually less than about 200° F., and at a rate between about 1000 SCF/hr and about 100,000 SCF/hr and at a pressure above atmospheric but preferably about 15 psig into SO$_x$ absorber 2. The absorber may comprise suitable gas-liquid absorption equipment such as a packed tower, a multi-plate column, a splash-deck column, a disk and donut column, or a venturi scrubber, but the design should be such that sufficient contact time is provided for the SO$_x$ components to react as fully as possible with the abosrbent recirculating through the absorber. Preferably, absorber 2 is of a packed tower design, and the stack gases pass countercurrently to the flow of the absorbent. An essentially SO$_x$-free (and thus desulfurized) product gas stream is discharged to the atmosphere by line 4 while recovered absorbent containing dissolved SO$_x$ compounds is withdrawn via line 5 and recycled via line 6, pump 7, and lines 8 and 9.

In the event the stack gas in line 1 contains fly ash or other particulate matter, as would be typical for a stack gas obtained from the combustion of coal, such particulate matter or fly ash is collected in the lower portion of the SO$_x$ absorber. It is removed therefrom as a slurry with some of the absorbent utilized in the SO$_x$ absorber and directed by line 10 to a fly ash pond or other waste facility.

The absorbent as introduced into the SO$_x$ absorber via line 3 may comprise any alkaline, aqueous solution useful for the removal of SO$_2$ and SO$_3$ from stack gas. The most typical absorbent comprises sodium hydroxide, although potassium hydroxide and even solutions of potassium thiosulfate and potassium formate, as used in the well-known Consol process, may also be utilized. Suitable concentrations of dissolved alkali compounds in the absorbent solution range between about 5 and 50 percent by weight, usually between about 10 and 20 percent by weight. These absorbents, when recycled at an appropriate rate and pH through SO$_x$ absorber 2, remove essentially all SO$_x$ compounds from the stack gas, producing an absorbent solution containing such oxysulfur anions as sulfite and sulfate ions, the latter being formed not only by the dissolution of SO$_3$ but also by the absorption of SO$_2$ in the presence of oxygen.

As the absorbent solution becomes increasingly more concentrated in sulfur-containing anions, it must be replenished with fresh absorbent. Thus, at steady state, fresh absorbent must be introduced into absorber 2 while spent absorbent is removed partly by line 10 but mostly by line 11. To reduce the rate at which make-up absorbent must be introduced via line 3, it is usually required that the spent absorbent removed via line 11 be regenerated. In most cases, this is accomplished, as in the Wellman-Lord process, by heating the spent absorbent solution in a suitable heating or distillation vessel 12 to drive off absorbed SO$_2$, thereby obtaining in line 13 a product gas rich in SO$_2$ and useful as a feed to a Claus plant for the manufacture of sulfur. Also obtained is a solution once again active for the removal of SO$_x$ in absorber 2, and accordingly this solution is recycled to absorber 2 via pump 14 and lines 15, 16 and 17.

Since some SO$_x$ compounds dissolve in forms not readily decomposed to SO$_2$, a bleed stream comprising sulfate ions and, in the usual instance, one or more oxysulfur anions selected from the group consisting of sulfite, bisulfite, bisulfate, and thiosulfate ions, is withdrawn from heating means 12 via line 18. According to the process of this invention, the bleed stream in line 18 is introduced to one or more diaphragmless, electrolytic, mercury cells, represented in the drawing as the single cell 20.

Electrolytic cell 20 comprises a cell housing 21 constructed to provide an inlet 22 for the bleed stream, an outlet 19 for the product slurry consisting essentially of an aqueous liquid product containing dispersed particles of elemental sulfur, another outlet 23 for gases produced by the chemical reactions occurring within cell 20, and an outlet 43 and inlet 44 for the withdrawal of amalgam and return of mercury. Cell housing 21 may be composed of any suitable material customarily used in the construction of diaphragmless, mercury, electrolytic cells, including such materials as concrete, ebonite-lined steel, reinforced plastic or ceramic, and rubber convered steel. A suitable a.c.-d.c. converter 26 impresses a voltage or potential difference across a mercury pool 41 acting as cathode and several graphite rods 42 acting as anode, with the magnitude of the potential difference being adjusted to produce elemental sulfur without also producing a significant amount of hydrogen sulfide from the particular aqueous stream entering inlet 22.

The reduction of positive valence sulfur atoms to elemental sulfur occurs at the mercury pool cathode 41 while the consumption of water and the oxidation of negative valence sulfur atoms occurs at the graphite anode 42. Assuming that the electrolye solution in the mercury cell contains sulfite, sulfate, and thiosulfate anions in equal molar ratios, the chemical half-reactions occurring within the cell may be formulated as follows:

Cathodic Reactions

$$SO_3^{--} + 4e^- + 3H_2O \rightarrow S + 6OH^- \tag{I}$$

$$SO_4^{--} + 6e^- + 4H_2O \rightarrow S + 8OH^- \tag{II}$$

$$S_2O_3^{--} + 6e^- + 6H^+ \rightarrow S + 3H_2O + S^{--} \tag{III}$$

Anodic Reactions

$$7H_2O \rightarrow 14H^+ + 3\tfrac{1}{2}O_2 + 14e^- \tag{IV}$$

$$S^{--} \rightarrow S + 2e^- \tag{V}$$

with the overall anion reduction being formulated as:

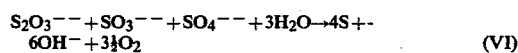

$$S_2O_3^{--} + SO_3^{--} + SO_4^{--} + 3H_2O \rightarrow 4S + 6OH^- + 3\tfrac{1}{2}O_2 \tag{VI}$$

Simultaneously with the above theorized reactions is the side reaction involving the reduction of alkali metal ions to alkali metal in amalgam form, which side reaction may be formulated (if the alkali metal is sodium) as:

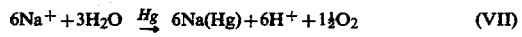

$$6Na^+ + 3H_2O \xrightarrow{Hg} 6Na(Hg) + 6H^+ + 1\tfrac{1}{2}O_2 \tag{VII}$$

and the net overall reaction occurring within the cell is the sum of reactions (VI) and (VII):

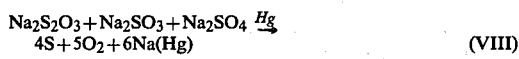

$$Na_2S_2O_3 + Na_2SO_3 + Na_2SO_4 \xrightarrow{Hg} 4S + 5O_2 + 6Na(Hg) \tag{VIII}$$

Withdrawn from diaphragmless, electrolytic, mercury cell 20 are an aqueous liquid in line 27 containing dispersed particles of sulfur, elemental oxygen from outlet 23, and a sodium amalgam in line 28. The amalgam is introduced into decomposer 29 wherein, by countercurrent contact in a bed of graphite packing with an aqueous liquid interconnected from line 30, the amalgam is decomposed according to the following chemical reaction:

$$2Na(Hg) + 2H_2O \rightarrow 2Hg + 2NaOH + H_2 \tag{IX}$$

The products obtained from Reaction IX separate into a hydrogen gas phase that collects in the upper portion of decomposer 29 and a two-phase liquid of caustic solution and mercury, the latter of which collects in the lowest portion of decomposer 29 due to its high density. A stream of elemental hydrogen suitable as a fuel is removed from the upper portion of decomposer 29 by line 31 while a stream of elemental mercury is removed from decomposer 29 via line 32 and then recycled to the electrolytic cell 20 by mercury pump 33 and recycle line 34. Also obtained from decomposer 29 is a relatively pure, aqueous solution of caustic, which may either be recovered as a by-product or, if the circumstances permit, be directed by recycle line 35 as fresh $SO_x$ absorbent for absorber 2.

The sulfur-aqueous liquid slurry recovered from cell 20 via line 27 may be treated in any convenient manner to separate elemental sulfur from the aqueous carrier. One method involves heating the aqueous stream obtained in line 27 under suitable pressure such that the sulfur is liquefied and then separated from the aqueous carrier by density difference in a decanter. Another is to pass the stream to a suitable liquid-solid separation zone 36 wherein elemental sulfur is separated, as by centrifugation or filtration, from the aqueous carrier. The particulate sulfur is thus ejected as a solid through conduit 37 while the aqueous filtrate is collected in line 30 and preferably used as the aqueous media required in decomposer 29.

In the preferred embodiment of the invention, the liquid mercury and the aqueous electrolyte in cell 20 are agitated to maintain cell efficiency and prevent polarization. Accordingly, means are included, such as a mechanical stirrer not shown, for agitating the liquids in cell 20. As an alternative to a mechanical stirrer, recycle pumps may be used to keep both the electrolyte and mercury liquids circulating through the cell.

Keeping the liquids agitated by either of the foregoing or equivalent methods aids in keeping the dispersed elemental sulfur separate from the mercury. It would obviously be undesirable to allow a layer of solid sulfur to accumulate on the mercury surface, and accordingly, it is necessary in the preferred embodiment to separate the dispersed elemental sulfur from the mercury. This is preferably achieved by collecting the sulfur as a froth floating on the surface of the electrolyte. Elemental sulfur produced in cell 20 tends to float to the surface of the electrolyte because gas streams bubble from the anode, and some of the gas becomes entrapped in the dispersed sulfur particles, thereby sufficiently reducing the density thereof to cause flotation. Agitation enhances this flotation effect and renders it more efficient because sulfur particles are constantly being stirred into, and thus being more intimately contacted with, the gas bubbles emanating from the anode.

One method by which the electrolyte may be agitated and the flotation effect enhanced still further is by introducing one or more gas streams into the lower portion of the cell. In one embodiment, air or other gas is bubbled from the bottom of the cell through both the mercury and the electrolyte liquids to be collected with the product oxygen in outlet pipe 23. A more preferred embodiment, in which energy losses involved in pressurizing a gas through mercury are minimized, the injection gas, which is preferably a portion of product oxygen obtained in line 23, is introduced into cell 20 at a location therein just above the mercury-electrolyte boundary. This may be accomplished by injecting the gas through pipe 38 into header 39 to bubble the gas into the electrolyte from a number of distribution points 40 lying near the mercury-electrolyte boundary.

Yet another means for introducing a multitude of gas streams into the cell from the mercury-electrolyte boundary is by periodically increasing the voltage across the electrodes of the cell to the point that hydrogen gas is produced from the mercury cathode. After bubbling up through the electrolyte and aiding in producing the sulfur froth, the hydrogen is collected with the oxygen gas leaving the cell by outlet 23.

The following illustrative example is provided to demonstrate the feasibility of producing elemental sulfur in a diaphragmless, mercury, electrolytic cell from an aqueous solution containing oxysulfur anions.

EXAMPLE

Into a 3-liter flask was introduced a quantity of mercury, which lay in the bottom portion of the flask in contact with a platinum wire sealed through the glass. Two liters of an aqueous solution comprising 30–35 wt.% $Na_2S_2O_3 \cdot 5H_2O$ were then introduced into the flask. Subsequently, carbon rods of dimensions ¾ inch diameter by 6 inch length were placed through the four openings at the top of the flask and contacted with the aqueous solution. When a voltage of between about 5 and 8 volts was impressed across the carbon rods acting as anode and the mercury pool acting as cathode, elemental sulfur was found to form in the electrolyte while a gas stream bubbled from each of the four carbon rods.

Although the invention has been described in conjunction with an example, many variations, modifications and alternatives of the invention as described will be apparent to those skilled in the art. As an illustration, although much attention has been devoted in the description of the invention to treating a solution containing cations of the alkali metals, it is clear that aqueous solutions containing other cations, particularly ammonium cations if the pH within the cell is properly maintained to prevent the evolution of ammonia gas, may be electrochemically treated to convert the oxysulfur anions in such solutions to sulfur. In so doing, advantages not realized with solutions containing alkali metal cations may be obtained. For example, when ammonium ion-containing solutions are treated, no amalgam will form in the cell, thereby obviating an amalgam decomposer and mercury pump with their attendant costs. Accordingly, it is intended to embrace within the invention all such variations, modifications, and alternatives that fall within the spirit and scope of the appended claims.

We claim:

1. A process for electrolytically converting sulfur-containing anions in an aqueous solution into elemental sulfur, which process comprises (1) introducing an aqueous solution comprising one or more sulfur-containing anions into an electrolytic cell containing at least one electrolyte chamber wherein said aqueous solution is in intimate contact with both an anode and an elemental mercury cathode, (2) passing an electric current of sufficient voltage across said electrodes through said aqueous solution to cause one or more of the sulfur-containing anions to be converted to elemental sulfur, and (3) withdrawing from said cell a slurry comprising an aqueous liquid product containing dispersed particles of elemental sulfur.

2. A process as defined in claim 1 wherein said one or more sulfur-containing anions are selected from the group consisting of sulfate, sulfite, bisulfate, bisulfite, sulfide, and thiosulfate ions.

3. A process as defined in claim 1 wherein the anode comprises graphite.

4. A process as defined in claim 1 wherein one or more gas streams are injected into the lower portion of the cell so that said elemental sulfur is collected as a froth near the surface of said aqueous solution.

5. A process as defined in claim 1 wherein said mercury electrode is a mercury pool lying on the bottom of said cell.

6. In a process for desulfurizing a feed gas stream containing $SO_x$ compounds wherein an alkaline, aqueous, alkali metal-containing absorbent solution is utilized to absorb the $SO_x$ compounds from said feed gas stream, thereby producing a desulfurized product gas stream and a spent absorbent comprising a solution containing one or more alkali metal cations and one or more sulfur-containing anions, and said spent absorbent is heated to yield an $SO_2$-containing gas stream and an aqueous liquor containing one or more oxysulfur anions and one or more alkali metal cations, which liquor is in part recycled as fresh absorbent to absorb $SO_x$ and in part regenerated electrochemically to produce yet more fresh absorbent, the improvement comprising accomplishing the electrochemical regeneration by:

(1) introducing said part of said liquor to be regenerated as an electrolyte into a diaphragmless, electrolytic cell having an anode and a mercury pool cathode;

(2) passing an electric current of sufficient voltage through said electrolyte across the electrodes so as to produce elemental sulfur from said one or more oxysulfur anions and further produce an alkali metal amalgam;

(3) withdrawing from said cell a slurry comprising an aqueous liquid product containing dispersed particles of solid elemental sulfur and separating said aqueous product from said elemental sulfur;

(4) withdrawing said alkali metal amalgam from said cell and contacting it with an aqueous liquid so as to produce elemental mercury and an alkali metal hydroxide solution;

(5) recycling said elemental mercury to said mercury pool in said cell; and (6) recycling said metal hydroxide solution as a fresh absorbent to absorb $SO_x$ compounds.

7. A process as defined in claim 6 wherein said one or more oxysulfur anions in said liquor are selected from the group consisting of sulfate, sulfite, bisulfate, bisulfite, and thiosulfate ions.

8. A process as defined in claim 6 wherein said anode comprises graphite.

9. A process as defined in claim 6 wherein one or more gas streams are injected into the lower portion of the cell so that said elemental sulfur is collected as a froth near the surface of the electrolyte.

10. A process as defined in claim 6 wherein elemental oxygen is produced in said cell and withdrawn therefrom as a gas stream, a portion of which gas stream is recycled to the lower portion of said cell and injected therein so that elemental sulfur is produced in said cell as a froth near the surface of the electrolyte.

* * * * *